United States Patent [19]
Stirn et al.

[11] Patent Number: 5,141,710
[45] Date of Patent: Aug. 25, 1992

[54] REACTIVITY MODULATION OF A BOILING WATER REACTOR TO STABILIZE THERMAL-HYDRAULIC INSTABILITIES

[75] Inventors: Richard C. Stirn, Morgan Hill; Glen A. Watford, San Jose, both of Calif.

[73] Assignee: General Electric Company, San Jose, Calif.

[21] Appl. No.: 720,131

[22] Filed: Jun. 24, 1991

[51] Int. Cl.⁵ .............................................. G21C 7/26
[52] U.S. Cl. .................................. 376/254; 376/277; 376/349
[58] Field of Search ............... 376/254, 255, 246, 277, 376/278, 349; 976/DIG. 132, DIG. 133

[56] References Cited

U.S. PATENT DOCUMENTS

| | | |
|---|---|---|
| 3,799,839 | 3/1974 | Fischer et al. |
| 3,802,992 | 4/1974 | Griffith et al. |
| 5,015,434 | 5/1991 | Wimpee et al. ............ 376/254 |

OTHER PUBLICATIONS

S. Andersson et al. Experimental Investigations of BWR Core and Coolant Channel Flow Stability. Idaho National Engineering Lab. Stability Symposium. Aug. 10–11, 1991.

Primary Examiner—Brooks H. Hunt
Assistant Examiner—Frederick H. Voss
Attorney, Agent, or Firm—Robert R. Schroeder

[57] ABSTRACT

To stabilize boiling water reactors against neutron flux oscillations caused by thermal-hydraulic instabilities, random core-wide reactivity perturbations are induced in the reactor either to suppress the onset of asymmetric (regional) mode oscillations or, in response to the detection of asymmetric mode oscillations, to stabilize the reactor in a symmetric (core-wide) oscillation mode. The reactivity perturbations are produced by effecting random changes in dome pressure, core flow or coolant enthalpy.

20 Claims, 6 Drawing Sheets

REACTIVITY MODULATION OF A BOILING WATER REACTOR TO STABILIZE THERMAL-HYDRAULIC INSTABILITIES

The present invention relates to nuclear reactors and particularly to protecting nuclear reactors from deleterious consequences of thermal-hydraulic instabilities.

BACKGROUND OF THE INVENTION

In known types of nuclear reactors, such as boiling water reactors (BWR), the reactor core comprises a plurality of fuel assemblies arranged in an array capable of self-sustained nuclear fission reaction. The core is contained in a pressure vessel and submerged in water, which serves as both a coolant and a neutron moderator. A plurality of control rods containing neutron absorbing material are insertable in gaps between the fuel assemblies to control the reactivity of the core. Each fuel assembly includes a flow channel through which water is pumped upwardly from a lower plenum to an upper plenum. To monitor the power density of the core, it is common practice to distribute neutron detectors both radially and axially throughout the core. The signals from these neutron detectors are utilized to monitor core conditions and to initiate corrective actions, including reactor shutdown (SCRAM), in the event of a detected abnormality.

One reactor abnormality that has come under close scrutiny due to recent events is thermal-hydraulic instability. As water is pumped upwardly through the fuel assembly flow channels, vaporization occurs. The resulting vapor bubbles are in constant motion, ever expanding and contracting. This produces variations in the two-phase fluid flow through the channels. If these flow variations are not dampened or suppressed by normal flow losses due to friction, they can build into sustained oscillations. Since the fluid is also a neutron moderator, flow oscillations will result in neutron flux oscillations and thus power oscillations along the vertical length of the fuel assemblies. With recent changes in plant operating modes and fuel neutronic and heat transfer characteristics, such thermal-hydraulic induced power oscillations could conceivably exceed minimum critical power ratio (MCPR) safety limits.

Such thermal-hydraulic instabilities, which have the potential of exceeding stability margins only under high power and low coolant flow operating conditions, can occur symmetrically throughout the core (core-wide oscillations) or asymmetrically, wherein core flow and consequent neutron flux in various regions of the core oscillate in out of phase relation (regional oscillations).

Existing in-core power monitoring instrumentation has been largely directed to monitoring average power by averaging the signals from selected neutron detectors widely distributed within the core. While such average power range monitoring (APRM) systems can detect and initiate action to suppress unacceptably high core-wide neutron flux oscillations, they do not reliably detect regional oscillations, since averaging detector signals that are relatively out of phase results in substantial cancellation.

In commonly assigned, copending Watford et. al. application entitled "Oscillation Power Range Monitoring System and Method for Nuclear Reactors", Serial No. 07/644,349, filed Jan. 22, 1991, a system and method are disclosed for reliably detecting both core-wide and regional neutron flux oscillations due to thermal-hydraulic instabilities. Upon detection of the onset of such oscillations, a signal is generated to initiate an appropriate reactor control function to suppress the oscillations before they can build to magnitudes exceeding an established reactor stability margin.

To this end, detector signals from local power range monitoring (LPRM) strings, radially distributed throughout the reactor core, are selectively assigned to a core-wide array of oscillation power range monitoring (OPRM) cells to develop unique cell output signals representative of the average neutron flux density or power existing at highly localized regions distributed throughout the reactor core.

Four oscillation power range monitoring (OPRM) channels are respectively assigned to selected groups of OPRM cells distributed throughout the core in geographically overlapping and partially lapping relations. The output signal of each OPRM cell is repetitively sampled and processed to detect oscillations thereof which are characteristic of the onset of a thermal-hydraulic instability. When an oscillation of an amplitude meeting certain setpoint and frequency criteria is detected, the assigned OPRM channel is tripped. If at least two OPRM channels are tripped, an unacceptable thermal-hydraulic instability is reliably indicated, and an automatic suppression function (ASF) is initiated to suppress the oscillations.

As noted above, thermal-hydraulic instabilities resulting in neutron flux oscillations of concern (particularly asymmetrical oscillations) have been found to occur only when a BWR reactor is operating under high power/low coolant flow conditions. Thus, it has been proposed to restrict reactor operation to the stable region of the reactor's power/flow map, wherein the power/flow ratio is sufficiently low to preclude thermal-hydraulic instabilities. If entry into the potentially unstable region inadvertently occurs, measures are automatically instituted to exit the region, e.g., either reduce power or increase coolant flow. Although entry into the unstable power/flow region is never planned, certain plant operating modes may cause a BWR reactor to operate close to the boundary line defining the two regions, and, under certain conditions, excursions into the potentially unstable region can occur.

SUMMARY OF THE INVENTION

The objective of the present invention is to provide various alternative automatic suppression functions which are initiated either by the OPRM system of the cited copending application or a power/flow monitor to suppress thermal-hydraulic instabilities and thus stabilize the reactivity of a BWR reactor core in a core-wide, symmetrical oscillation mode.

Thus, in accordance with the present invention, there is provided a reactivity modulator which operates in response to either the detected onset of or the potential for thermal-hydraulic instabilities to induce core-wide perturbations in the core reactivity. These reactivity perturbations are of a character to force asymmetric (regional) oscillations into symmetric (core-wide) oscillations. It has been found that asymmetric oscillations have a far greater potential of building to magnitudes jeopardizing stability margins and fuel safety limits than do symmetric oscillations. Thus by forcing asymmetrical oscillations into symmetrical oscillations or precluding the initiation thereof, an acceptably stable core operating mode is maintained without resort to more disruptive suppression functions, such as rapid control rod insertion (SCRAM) or abrupt increase in core flow.

To modulate core reactivity in accordance with the present invention, the reactivity modulator induces core-wide perturbations which are random in character, i.e., randomly varying in perturbation pulse frequency and perturbation pulse width. Preferably, the perturbation pulse amplitude is fixed based on reactor design, but may also be varied on a random basis. In one embodiment of the invention, reactor dome pressure perturbations are induced either by repeatedly changing the position of a turbine control valve in the main steamline or momentarily opening and closing a main steamline pressure relief valve in the above-described random manner. An alternative embodiment involves introducing perturbations in the coolant enthalpy by controlling incremental changes in the feedwater pump speed in a random manner, while in another embodiment of the invention, either the recirculating pump speed is randomly varied or the position of a recirculating line control valve is randomly changed to introduce core-wide perturbations in core flow.

BRIEF DESCRIPTION OF THE DRAWINGS

For a full understanding of the nature and objective of the present invention, reference may be had to the following Detailed Description taken in conjunction with the accompanying drawings, in which.

DETAILED DESCRIPTION

Figure 1:
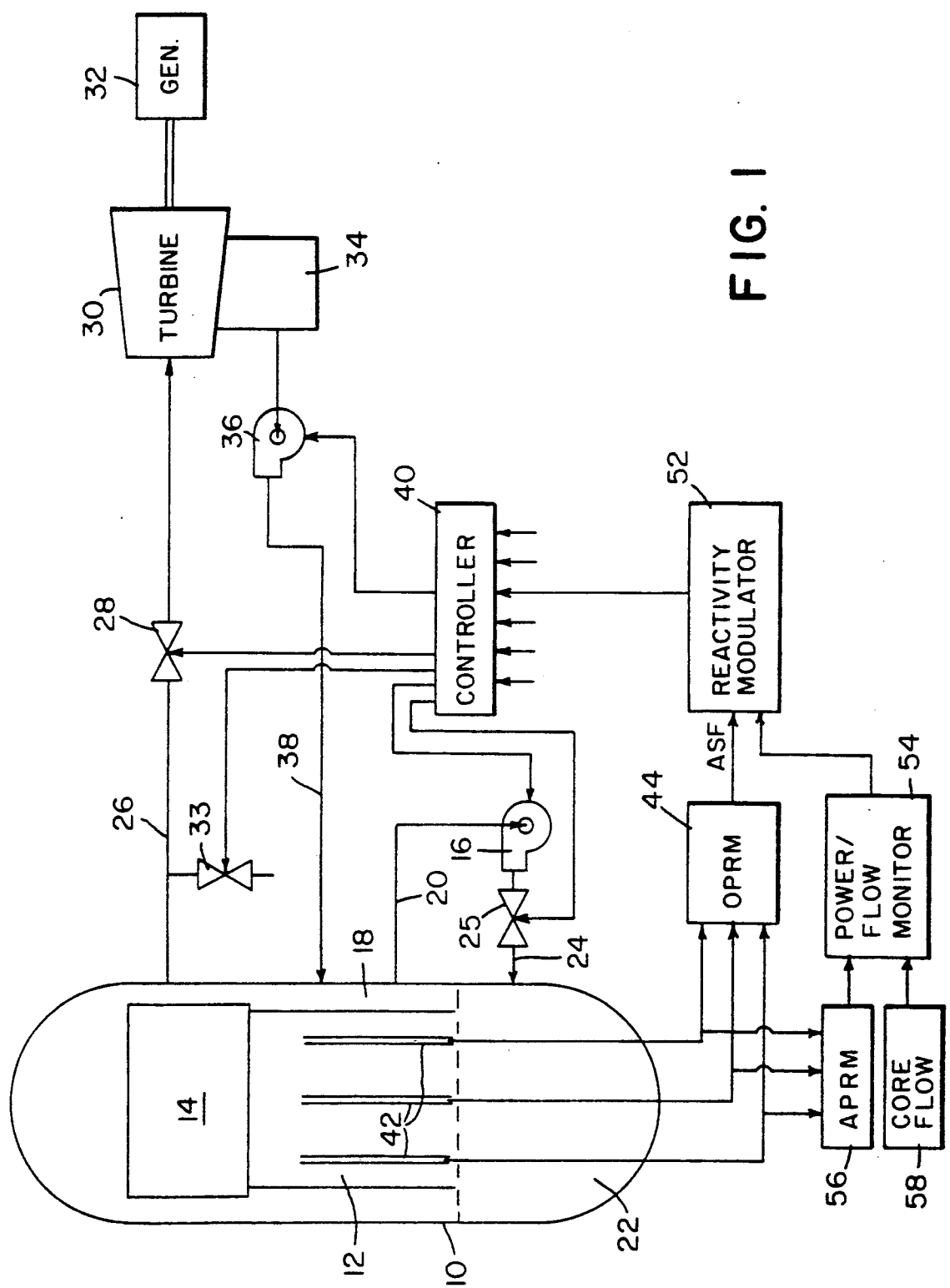
FIG. 1 is a block diagram illustrating the method of present invention as practiced in its several embodiments.

FIG. 1 schematically illustrates the application of the present invention to stabilize thermal-hydraulic instabilities in a boiling water reactor (BWR) including a pressure vessel 10 containing, inter alia, a core 12 and steam separating and drying apparatus 14. As is well understood in the art, the core includes a plurality of fuel assemblies, each comprised of a multiplicity of fuel rods (not shown). The vessel is filled to a level slightly above the core with a coolant and neutron moderator, typically light water. The coolant is circulated through the core by a recirculating pump 16 which takes coolant from an annular downcomer region 18 via piping 20 and pumps it into a lower plenum 22 via piping 24 and a flow control valve 25. From the lower plenum, coolant is forced upwardly through the fuel assemblies in flow channels (not shown) to establish core flow. During upward flow through the core, the coolant is heated to vaporization by the high temperatures of the fuel rods, resulting in a two-phase fluid (steam and water) emerging from the upper ends of the flow channels. Steam is separated from the water by apparatus 14 and then routed through a steamline 26 and a control valve 28 to drive a turbine 30 which, in turn, drives a generator 32. A pressure relief valve 33 provides overpressure protection for the main steamline. The turbine exhausts to a condenser 34, and the resulting condensate is returned as subcooled feedwater by a feedwater pump 36 and piping 38 to downcommer region 18 where it mixes with and cools the liquid coolant from separator apparatus 14. The coolant is then recirculated by the recirculating pump as described above. To regulate the operations of the recirculating pump, turbine control valve and feedwater pump on a real time basis consistent with the current operating mode of the reactor, a controller 40, acting on response to various inputs, routes controlling outputs to these components.

Still referring to FIG. 1, radially distributed throughout the core at appropriate locations amongst the fuel assemblies are local power range monitoring (LPRM) strings, schematically indicated at 42. Each string includes a hollow tube containing typically four neutron detectors responsive to neutron flux existing at their respective vertically spaced locations. The LPRM strings can thus monitor local power densities at highly localized regions distributed radial and axially throughout core 12. As disclosed in the above-cited copending U.S. application Ser. No. 07/644,349, whose disclosure is specifically incorporated herein by reference, the LPRM detector signals are fed to an oscillation power range monitoring (OPRM) system, indicated herein at 44 in FIG. 1. Here, the neutron detector signals are assigned to OPRM cells corresponding to localized regions of the core and processed in the manner disclosed to produce an OPRM cell trip signal if the onset of a asymmetric or regional neutron flux oscillation is indicated. The OPRM cells are selectively assigned to OPRM channels corresponding to geographically lapped regions of the core, and the OPRM channels are selectively assigned to reactor protection system trip channels, such that OPRM cell trip signals are processed by two-out-of-four decision logic before an automatic suppression function (ASF) signal is issued to initiate action to suppress building oscillations before fuel safety limits are exceeded.

Figure 2:
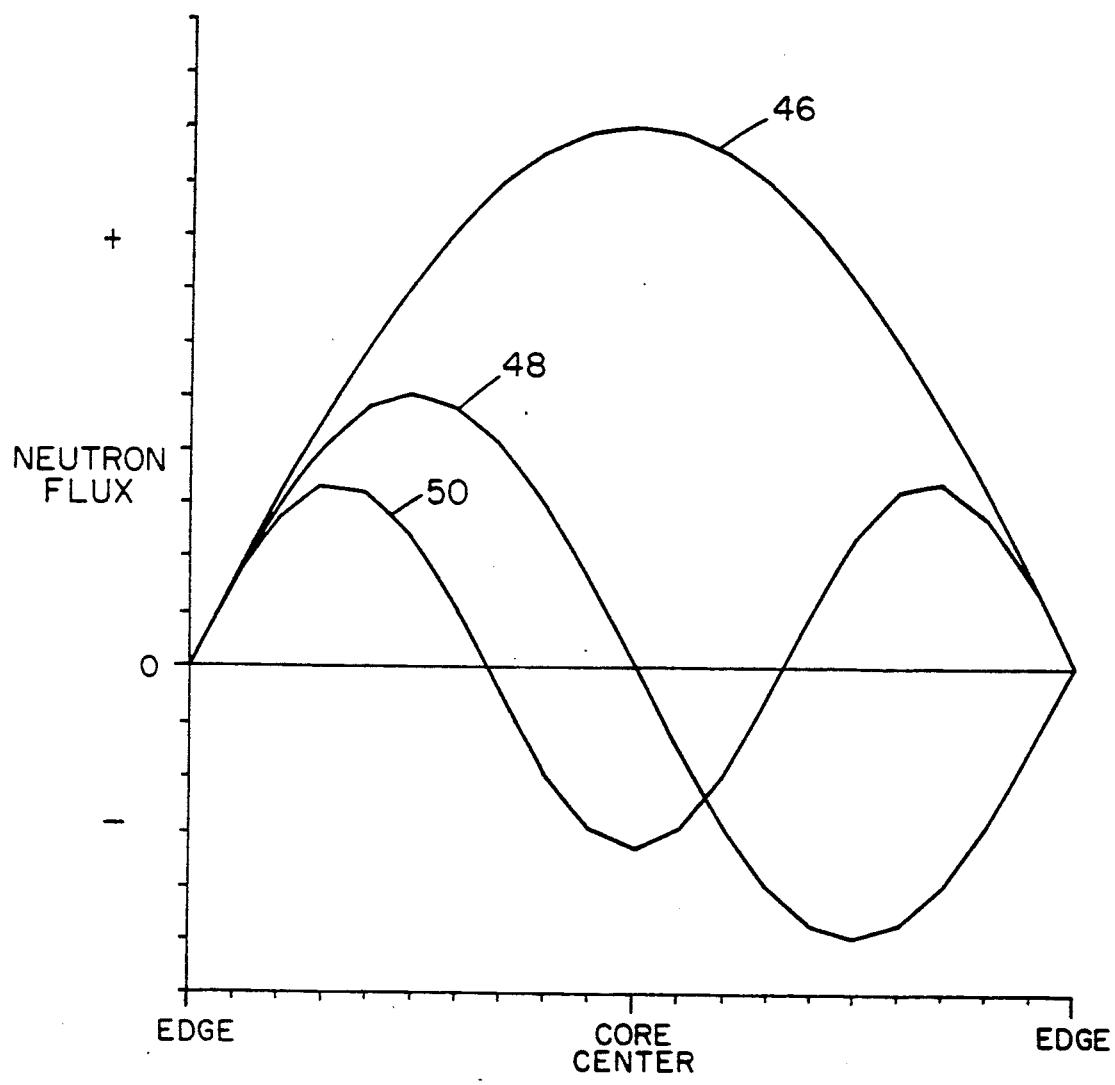
FIG. 2 are wave diagrams illustrating several neutron flux oscillating modes encountered in the reactor of FIG. 1.

In accordance with one aspect of the present invention, rather than initiate immediate conventional action to suppress building oscillations indicative of a thermal-hydraulic instability, an attempt is made to stabilize the core by inducing core-wide reactivity perturbations tending to force the core to a stable oscillating mode before any stability margin is violated. Similar to other systems which are described by classical wave equations, neutron flux distribution in a BWR can be described by an infinite number of solutions or modes. These modes represent neutron flux "shapes" or waveforms which spatially satisfy all the required boundary conditions of the reactor. Like a flexible rod fixed at its ends, a disturbance to the neutron flux at a given location can result in oscillations in the neutron flux, even though the flux at the core edges remains constant. The dominant mode is the fundamental mode which maintains a cosine-type shape and is positive at all points in the core. Other modes (harmonics) must satisfy the fixed edge conditions of the core, but are not required to remain positive at all locations within the core. FIG. 2 illustrates several possible modes of spatial neutron flux distribution in the radial direction of a cylindrical core, with the fundamental oscillation mode indicated at 46, the first harmonic at 48 and the second harmonic at 50.

In a BWR, conditions can be established in which a mode other than the fundamental mode is the preferred mode, resulting in asymmetric oscillations. By introducing perturbations that are specific to a mode, the reactor can be preferentially driven into that mode. Thus, by introducing core-wide reactivity perturbations, the reactor can be forced into the core-wide or fundamental mode. This is analogous to continually plucking a flexible rod, fixed at both ends, at its midlength point to excite the fundamental mode of oscillation.

To provide the desired core-wide reactivity perturbations, the present invention utilizes a reactivity modulator 52 which is connected to receive an ASF signal from oscillation power range monitoring system 44. The modulator provides a reactivity modulating signal as one input to controller 40 in response to an ASF signal.

Figure 3:
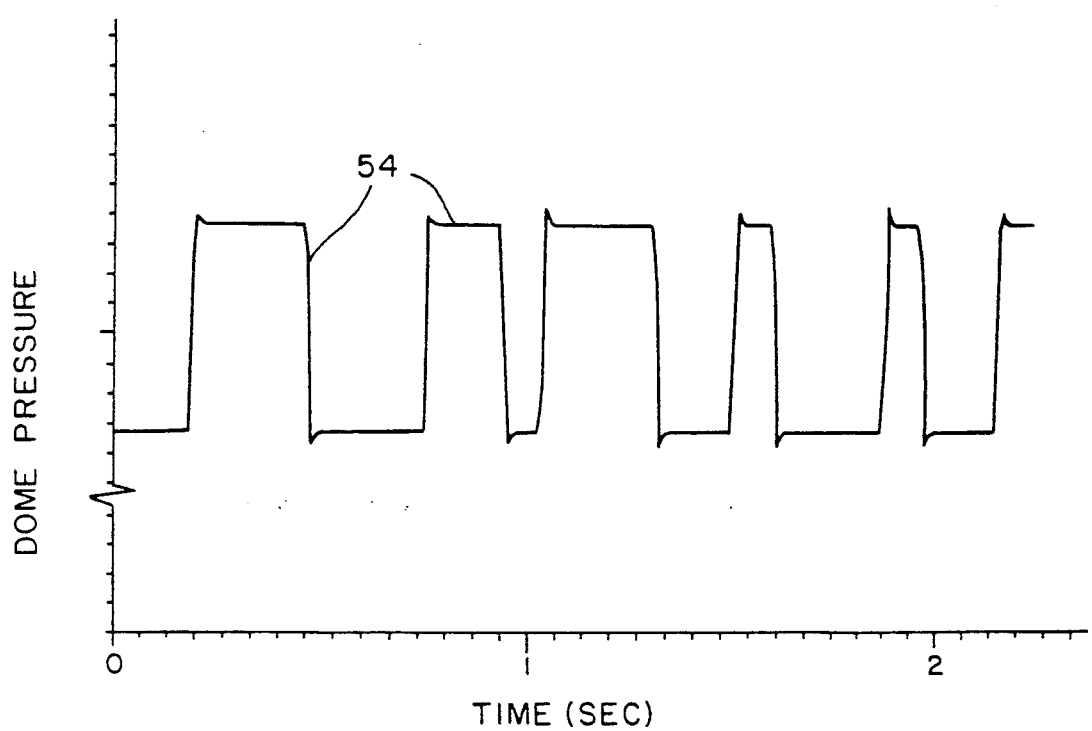
FIG. 3 is a pulse diagram exemplifying core-wide perturbations introduced upon practice of the present invention.

In one embodiment of the invention, the controller directs the reactivity modulating signal to turbine control valve 28 to produce small changes in valve position. This, in turn, introduces corresponding perturbations in the reactor dome pressure which have a core-wide effect on neutron flux oscillations in core 12. As an important feature of the invention, the reactivity modulating signal is of a character to produce, via small changes in turbine control valve position, random perturbations in dome pressure. FIG. 3 illustrates an exemplary random series of dome pressure perturbation pulses 54. It is seen that the pressure perturbation pulses randomly vary in width (duration) and frequency over an illustrated duration of approximately 2.50 seconds. The pulse amplitude is seen to be fixed and represents a momentary dome pressure increase which may range from 10 to 100 PSI, depending on reactor design. For a typical reactor design, the dome pressure perturbation amplitude may be in the 20-30 PSI range. It will be appreciated that the dome pressure perturbation amplitude may also be randomly varied. Moreover, the random perturbations may be momentary decreases in dome pressure.

Similar core-wide dome pressure perturbations are introduced by randomly opening and closing relief valve 33 connected into main steamline 26.

Figure 4:
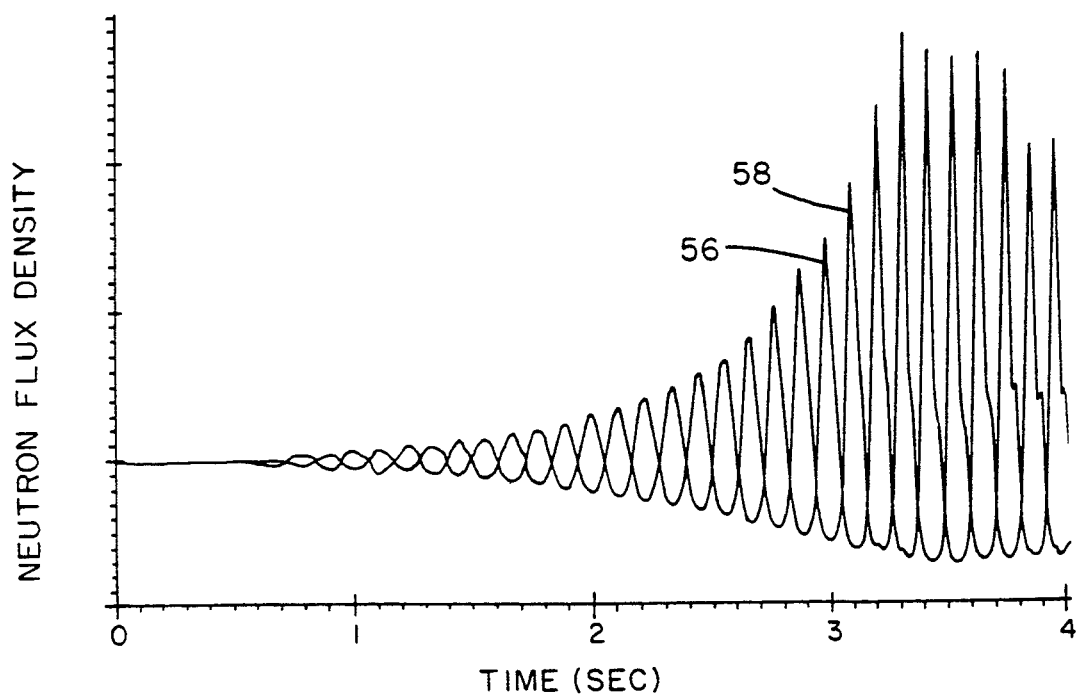
FIG. 4 illustrate neutron flux oscillations detected at spaced core locations, which are indicative of an asymmetric oscillation mode.
Figure 5:
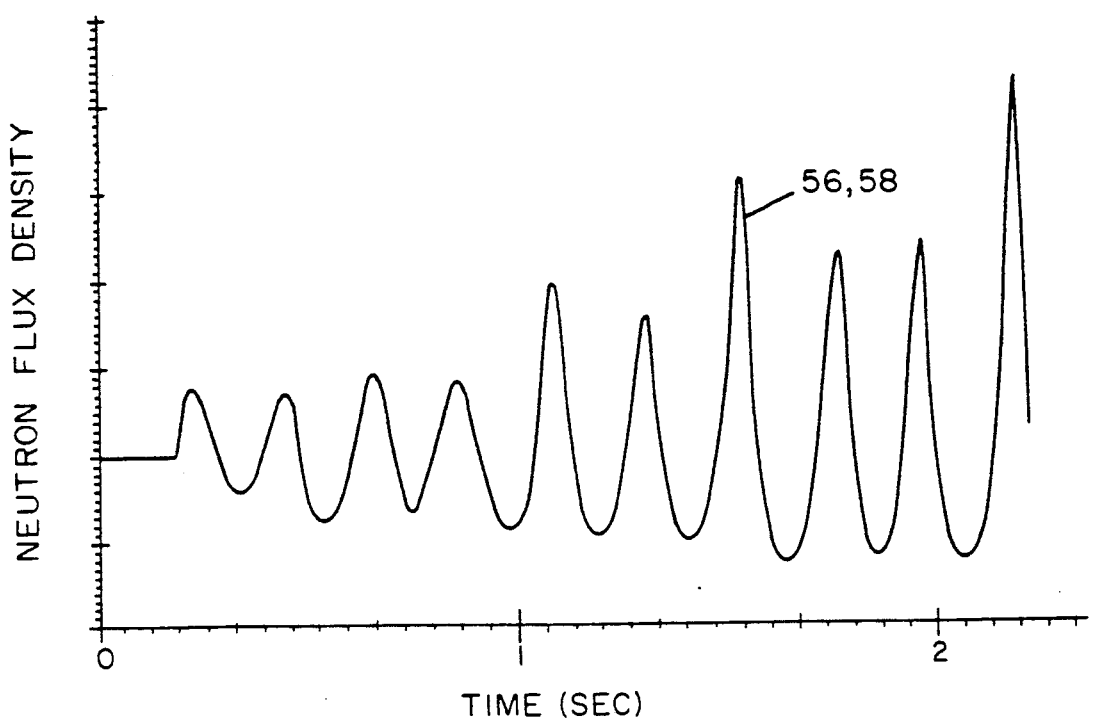
FIG. 5 illustrate neutron flux oscillations detected at the same core locations of FIG. 4, which indicate a symmetric oscillation mode.

FIG. 4 illustrates neutron flux oscillation waveforms 56 and 58 indicative of thermal-hydraulic instabilities in two flow channels located in widely spaced relation within core 12. The oscillations are seen to be in out-of-phase relation indicative of an asymmetric mode. After introducing random dome pressure perturbations, such as illustrated in FIG. 3, the asymmetric or regional oscillations were forced to a symmetric or core-wide mode. This condition is illustrated in FIG. 5, wherein neutron flux oscillations 56 and 58 are now in phase, indicating the core-wide fundamental mode.

By virtue of the random nature of the core-wide dome pressure perturbations, once asymmetric oscillations are forced into symmetric oscillations, the perturbations can not be in phase with the symmetric oscillations. Thus, the symmetric oscillations are not reinforced by the perturbations to increasing amplitudes, but rather are sufficiently disrupted by the random perturbations such that their amplitude is at least held relatively constant to impose an acceptably stable reactor operating mode.

Rather than randomly perturbing dome pressure to stabilize a core subjected to symmetric and asymmetric instabilities, the same result can be achieved by randomly perturbing core flow. In this embodiment of the invention, the reactivity modulating signal generated by reactivity modulator 52 in response to an ASF signal is directed by controller 40 to recirculating pump 16. The speed of the recirculating pump is varied to introduce random perturbations in core flow of the character described above for dome pressure. Such core flow perturbations are core-wide in their effect on neutron flux oscillations, and thus are capable of forcing asymmetric oscillations into symmetric oscillations to stabilize the core. Similar core-wide flow perturbations of comparable stabilizing effectiveness can be introduced by randomly changing the position of flow control valve 25 in recirculating line 24.

A third approach to stabilizing a BWR core is to induce random perturbations in coolant enthalpy. To this end, reactivity modulating signals are directed to feed water pump 36 to vary its speed in a random manner. This action varies the flow rate of the feedwater returning to vessel 10 and thus the feedwater-coolant mix in downcomer region 18. The temperature of the feed water-coolant mixture is thus randomly perturbed to introduce random perturbations in coolant enthalpy which are core-wide in their effect on neutron flux oscillations. Asymmetric neutron flux oscillations are driven to symmetric oscillations to stabilize the core.

Figure 6:
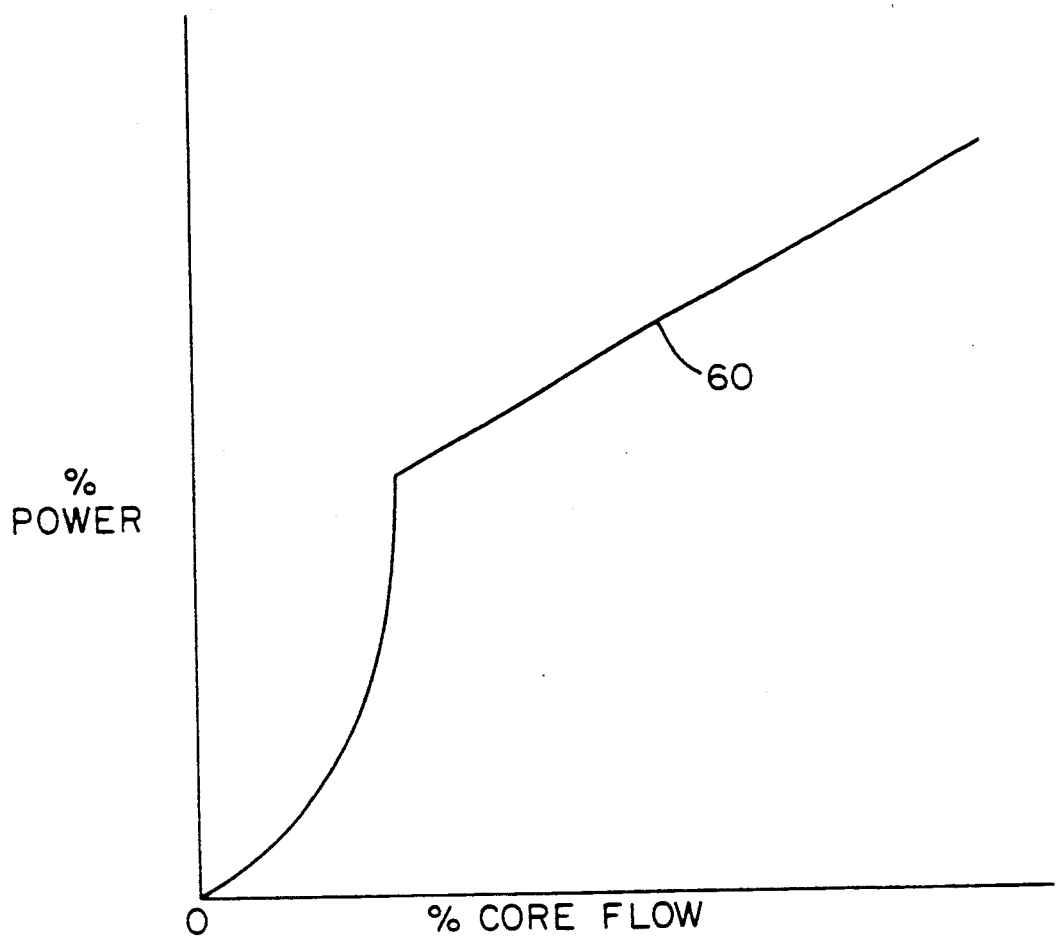
FIG. 6 is a graph of an exemplary power/flow map utilized in an alternative embodiment of the invention.

Rather than trigger reactivity modulation in response to the detected onset of neutron flux oscillations by OPRM system 44, it is within the scope of the present invention to trigger reactivity modulation when a BWR happens to enter a potentially unstable region of core power/flow conditions proven to be susceptible to thermal-hydraulic instabilities. By perturbing the reactor on a core-wide basis upon excursions into this potentially instable region, the initiation of neutron flux oscillations, particularly those in the asymmetrical mode, can be effectively suppressed. To this end and as seen in FIG. 1, a power/flow monitor 54 receives core power readings from the average power range monitoring (APRM) system 56 and coolant flow readings from a core flow meter 58. This meter provides accurate estimates of core flow based on the responses of sensors placed in the external portion of the coolant recirculation loop or within the vessel itself, as disclosed in O'Neil et. al. U.S. Pat. No. 4,975,239. These power and flow readings are processed in power/flow monitor 54 to determine whether the reactor is operating in a potentially unstable region above curve 60 in FIG. 6 or a stable region below the curve. Whenever the reactor enters the unstable region, as detected by the power/flow monitor, the reactivity modulator is triggered to begin introducing core-wide perturbations in dome pressure, coolant enthalpy or core flow in the manner described above. The resulting reactivity perturbations are continued as long as the reactor remains in the unstable power/flow region to effectively suppress the initiation of thermal-hydraulic instabilities that could exceed MCPR safety limits. Preferably, the perturbation amplitudes are limited to lower levels than in the situation described above wherein OPRM 44 has actually detected the onset of building neutron flux oscillations.

While the foregoing description has emphasized the efficacy of the present invention in stabilizing a nuclear reactor subjected to asymmetric (regional) oscillations detected by the oscillation power range monitoring system, it is appreciated that the disruptive effect on symmetric oscillations imposed by random reactivity perturbations can also force the core to a stable operating mode.

Having described the invention, what is claimed as new and desired to secure by Letters Patent is:

1. A method for stabilizing a boiling water reactor against asymmetric mode neutron flux oscillations, said method comprising the steps of
   A. monitoring operating conditions of a reactor core;
   B. automatically subjecting the reactor to a series of core-wide reactivity perturbations random in frequency and duration to suppress asymmetric neutron flux oscillations when certain operating conditions are detected.

2. The method defined in claim 1, wherein said monitoring step includes
   (1) monitoring neutron flux in a reactor core at a multiplicity of radially and axially distributed locations, and
   (2) automatically initiating said random core-wide reactivity perturbations when building asymmetric mode neutron flux oscillations are detected, thereby driving the asymmetric mode neutron flux oscillations to a stable symmetric mode.

3. The method defined in claim 2, wherein said series of random core-wide reactivity perturbations is induced by randomly perturbing reactor dome pressure.

4. The method defined in claim 3, wherein the step of randomly perturbing reactor dome pressure is performed by varying the position of a control valve in a main steamline to a turbine.

5. The method defined in claim 3, wherein the step of randomly perturbing reactor dome pressure is performed by opening and closing a pressure relief valve connected into a main steamline to a turbine.

6. The method defined in claim 4, wherein the dome pressure perturbing step produces perturbation pulses of increased pressure, said pressure perturbation pulses being of randomly varying pulse width and pulse frequency.

7. The method defined in claim 6, wherein said pressure perturbation pulses are of a uniform amplitude.

8. The method defined in claim 7, wherein said pressure perturbation pulse amplitude is in the range of 10 to 100 PSI.

9. The method defined in claim 2, wherein said random series of core-wide reactivity perturbations is induced by randomly perturbing core flow.

10. The method defined in claim 9, wherein the step of randomly perturbing core flow is performed by randomly varying the speed of a coolant recirculating pump.

11. The method defined in claim 9, wherein the step of randomly perturbing core flow is performed by randomly varying the position of a flow control valve in the coolant recirculating line.

12. The method defined in claim 2, wherein said random series of random core-wide reactivity perturbations is induced by randomly perturbing coolant enthalpy in a downcomer region of the reactor.

13. The method defined in claim 12, wherein the step of randomly perturbing coolant enthalpy is performed by randomly varying the speed of a feedwater pump to produce perturbations in the temperature of the coolant-feedwater mixture in the downcomer region adjacent the feedwater inlet thereto.

14. The method defined in claim 2, wherein said initiating step is executed when building neutron flux oscillations in the symmetric mode are detected, said series of random core-wide reactivity perturbations disrupting the buildup of symmetric mode neutron flux oscillations to stabilize the reactor in the symmetric mode.

15. The method defined in claim 1, wherein said certain operating conditions are excursions into a potentially unstable operating region of high power and low coolant flow.

16. The method defined in claim 15, wherein said random core-wide reactivity perturbations are continued while the reactor is operating in said potentially unstable region.

17. The method defined in claim 15, wherein said monitoring step includes the steps of
   (1) detecting core coolant flow,
   (2) detecting reactor power, and
   (3) correlating the detected reactor power and core flow with a power/flow map to identify excursions into said potentially unstable operating region.

18. The method defined in claim 17, wherein said random series of core-mode reactivity perturbation is induced by randomly penetrating reactor dome pressure.

19. The method defined in claim 17, wherein said random series of core-wide reactivity perturbations is induced by randomly perturbing core flow.

20. The method defined in claim 17, wherein said random series of core-wide reactivity perturbations is induced by randomly perturbing coolant enthalpy in a downcomer region of the reactor.

* * * * *